«12» United States Patent
Kuroda et al.

«10» Patent No.: US 10,059,577 B2
«45» Date of Patent: Aug. 28, 2018

«54» PERFORATOR AND GAS DISCHARGE APPARATUS

«71» Applicant: DAICEL CORPORATION, Osaka-shi, Osaka (JP)

«72» Inventors: Takao Kuroda, Tatsuno (JP); Tomohide Fujiwara, Tatsuno (JP); Akihiro Wakatsuki, Tokyo (JP)

«73» Assignee: DAICEL CORPORATION, Osaka-Shi (JP)

«*» Notice: Subject to any disclaimer, the term of this patent is extended or adjusted under 35 U.S.C. 154(b) by 155 days.

«21» Appl. No.: 15/304,024

«22» PCT Filed: Apr. 6, 2015

«86» PCT No.: PCT/JP2015/060692
§ 371 (c)(1),
(2) Date: Oct. 13, 2016

«87» PCT Pub. No.: WO2015/159746
PCT Pub. Date: Oct. 22, 2015

«65» Prior Publication Data
US 2017/0036901 A1 Feb. 9, 2017

«30» Foreign Application Priority Data

Apr. 14, 2014 (JP) ................. 2014-082482

«51» Int. Cl.
B60R 21/274 (2011.01)
B67B 7/92 (2006.01)
(Continued)

«52» U.S. Cl.
CPC .............. B67B 7/92 (2013.01); B60R 21/274 (2013.01); A62B 33/00 (2013.01);
(Continued)

«58» Field of Classification Search
CPC ...... B60R 21/268; B60R 21/274; A62B 23/00
(Continued)

«56» References Cited

U.S. PATENT DOCUMENTS 4,222,443 A * 9/1980 Chromy ............... B25D 11/125
173/201
4,232,417 A * 11/1980 Miller ....................... B63C 7/10
119/858

(Continued)

FOREIGN PATENT DOCUMENTS

DE 19545077 A1 6/1997
EP 0 965 483 A2 12/1999
(Continued)

OTHER PUBLICATIONS

Extended European Search Report, dated Oct. 19, 2017, for European Application No. 15780580.5.

Primary Examiner — Gregory Huson
Assistant Examiner — Nikhil Mashruwala
«74» Attorney, Agent, or Firm — Birch, Stewart, Kolasch & Birch, LLP

«57» ABSTRACT

The present invention relates to a perforator for breaking a closing member at a gas outlet of a gas bottle to allow a gas to flow out. The perforator includes a cylindrical housing having three openings, namely, a first opening at a first end portion, a second opening at a second end portion which is opposite to the first end portion, and a third opening formed in a circumferential wall portion, an ignition device being fixed at the first opening, the second opening to be connected to the gas bottle and the third opening serving as a gas discharge portion, and when a pressure created by actuation of the ignition device is received, the first piston moving in (Continued)

US 10,059,577 B2

Page 2 an axial direction, and the second piston moving towards the second opening by receiving the movement of the first piston.

5 Claims, 5 Drawing Sheets

(51) Int. Cl.
 *B63C 9/19* (2006.01)
 *A62B 33/00* (2006.01)
 *A62C 99/00* (2010.01)
 *B60R 21/26* (2011.01)

(52) U.S. Cl.
 CPC . *A62C 99/0027* (2013.01); *B60R 2021/26029* (2013.01); *B63C 9/19* (2013.01)

(58) Field of Classification Search
 USPC .............................................. 431/18; 280/736
 See application file for complete search history.

(56) References Cited

U.S. PATENT DOCUMENTS

| | | | | |
|---|---|---|---|---|
| 5,551,520 A | * | 9/1996 | Bethel | E21B 43/1185 175/4.54 |
| 5,947,172 A | * | 9/1999 | Glotin | B60S 5/04 141/19 |
| 6,234,522 B1 | | 5/2001 | Albrecht et al. | |
| 7,293,797 B2 | * | 11/2007 | Nakayasu | B60R 21/268 280/736 |
| 2003/0023361 A1 | | 1/2003 | Umeda et al. | |
| 2003/0111831 A1 | * | 6/2003 | Horton | B60R 21/261 280/736 |
| 2003/0111832 A1 | | 6/2003 | Kelley et al. | |

FOREIGN PATENT DOCUMENTS

| | | |
|---|---|---|
| EP | 1898102 A2 | 3/2008 |
| JP | 58-193952 U | 12/1983 |
| JP | 8-268211 A | 10/1996 |
| JP | 3068775 U | 5/2000 |
| JP | 3069811 U | 7/2000 |
| JP | 2001-158686 A | 6/2001 |
| JP | 2002-513347 A | 5/2002 |
| JP | 2003-26065 A | 1/2003 |
| JP | 3104482 U | 9/2004 |
| JP | 2006-502030 A | 1/2006 |
| JP | 2009-24887 A | 2/2009 |
| WO | WO 00/73126 A1 | 12/2000 |
| WO | WO 2014/208290 A1 | 12/2014 |

* cited by examiner (a)  (b)

PERFORATOR AND GAS DISCHARGE APPARATUS

FIELD OF INVENTION

The present invention relates to a perforator for breaking and opening a closing portion at a gas outlet of a gas bottle to allow a gas to flow out, and to a gas discharge apparatus using the perforator.

BACKGROUND ART

An apparatus is known in which an electric igniter is combined with a piston, and the piston is caused to move in a predetermined direction as a result of receiving a pressure created by combustion products generated by the actuation of the electric igniter (or a combination of the electric igniter with an explosive component).

EP-A No. 0965483 discloses an invention relating to a delay device for an explosive charge.

FIG. 1 depicts a device in which an electric igniter, two pistons, and a hydraulic oil are accommodated in a housing, and FIG. 2 depicts a device in which an electric igniter, a spring, and a single piston are accommodated in a housing.

It is indicated that the device depicted in FIG. 1 operates in the following manner.

Where an electric igniter 1 is actuated, a charge 2 is ignited and generates a gas. As a result of receiving the pressure of the gas, a first piston 5 moves in the axial direction inside a first cylinder 4. A hydraulic oil 10 is pushed by the movement of the first piston 5 and into a flow channel 6.

Since the flow channel 6 is connected to a second cylinder 8, a second piston 9 is moved in the axial direction inside the second cylinder 8 by the hydraulic oil pushed into the flow channel 6.

Since the second piston 9 has a cross-sectional area larger than that of the first piston 5, the movement speed of the second piston 9 is less than that of the first piston 5.

The delay device for an explosive charge disclosed in EP-A No. 0965483 uses the delay operation such as described hereinabove to change the inclination of a neck support provided at a seat of an automobile.

DISCLOSURE OF INVENTION

Invention 1 of the present invention provides
a perforator for breaking and opening a closing member at a gas outlet of a gas bottle to allow a gas to flow out, including
a cylindrical housing accommodating an ignition device, a first piston and a second piston,
the cylindrical housing having
three openings, namely, a first opening at a first end portion, a second opening at a second end portion which is opposite to the first end portion, and a third opening formed in a circumferential wall portion,
the ignition device being fixed at the first opening, the second opening to be connected to the gas bottle and the third opening serving as a gas discharge portion,
the first piston and the second piston being disposed, in the order of the first piston and the second piston, from the side of the ignition device to the side of the second opening in the cylindrical housing, and
when a pressure created by actuation of the ignition device is received, the first piston moving in an axial direction inside the cylindrical housing, and the second piston moving towards the second opening inside the cylindrical housing by receiving the movement of the first piston.

Invention 2 of the present invention provides
a perforator for breaking and opening a closing member at a gas outlet of a gas bottle to allow a gas to flow out, including
a housing accommodating an ignition device, a first piston and a second piston,
the housing including
a combination of a first cylindrical housing and a second cylindrical housing,
the second cylindrical housing having the both ends open and being connected to the first cylindrical housing having one end open and the other end closed, such that the second cylindrical housing passes through a circumferential wall surface of the first cylindrical housing,
three openings, namely, a first opening formed in the first cylindrical housing, a second opening formed in the second cylindrical housing on the axially opposite side of a connection portion with the first cylindrical housing, and a third opening formed in a circumferential wall surface of the second cylindrical housing,
the ignition device being fixed at the first opening, the second opening to be connected to the gas bottle, and the third opening serving as a gas discharge portion,
the first piston including a first piston head and a first piston rod extending from the first piston head, and a distal end surface of the first piston rod having a first inclined surface,
the second piston including a second piston head and a second piston rod extending from the second piston head, and a bottom surface of the second piston head having a second inclined surface of a shape enabling abutment against the first inclined surface, and
in the housing,
the first piston being disposed inside the first cylindrical housing such that the first piston head is on the side of the ignition device,
the second piston being disposed such that the second piston head is positioned inside the first cylindrical housing, and the second piston rod is positioned inside the second cylindrical housing,
the first inclined surface of the first piston and the second inclined surface of the second piston being disposed opposite each other, and
when a pressure created by actuation of the ignition device is received, the first piston moving in an axial direction inside the first cylindrical housing, and the first inclined surface of the first piston colliding with the second inclined surface of the second piston, thereby enabling the second piston to move in the axial direction inside the second cylindrical housing.

The present invention also provides a gas discharge apparatus in which the perforator of the Invention 1 or the Invention 2 is combined with a gas bottle, wherein
the gas bottle is connected to the second opening of the housing of the perforator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
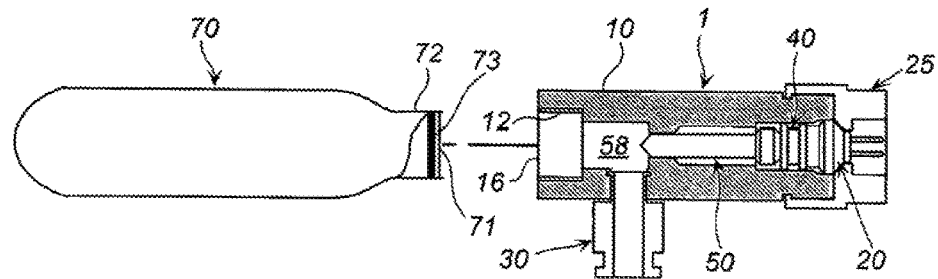
FIG. 1 shows a view for explaining a usage of the perforator of the present invention, the perforator being shown in an axial sectional view and the gas bottle being shown in a plan view (the gas outlet portion is shown in a partial sectional view)

The present invention provides a perforator in which an electric igniter and a piston are combined together and that breaks and opens a closing portion at a gas outlet of a gas bottle to allow a gas to flow out.

The present invention also provides a gas discharge apparatus using the perforator.

The perforator of the present invention breaks the closing member at the gas outlet of the gas bottle to allow a high-pressure gas filled therein to flow out.

The gas bottle can be selected, as appropriate, according to use, and is filled with a gas such as carbon dioxide, argon, helium, or nitrogen under a high pressure.

The cylindrical housing is formed of a metal such as iron and stainless steel.

The ignition device includes an electric igniter such as is used in a known gas generator for an airbag, or of a combination of the electric igniter and a transfer charge or a gas generating agent.

A first piston and a second piston may have the same outer diameter or may have partly different outer diameters.

The first piston and the second piston may be hollow to reduce the weight thereof.

The first piston and the second piston formed of a metal such as iron, stainless steel, and aluminum can be used, but the pistons can be formed of a ceramic, or may be a resin provided that heat resistance and strength are satisfied. The pistons may be of the same material or of different materials as long as the second piston has a hardness sufficient to break the closing portion at the gas bottle outlet.

Before the actuation, the first piston and the second piston may be in contact with each other in the axial direction, or may be separate from each other, provided that the first piston collides with the second piston and the second piston moves in the axial direction.

A gas discharge portion discharges a gas to the outside from the gas discharge portion when the closing portion at the gas outlet of the gas bottle is broken and the gas flows out. Therefore, the gas discharge portion is formed in a portion other than the attachment portion of the ignition device or the connection portion of the gas bottle.

The gas discharge portion may be an opening formed in the cylindrical housing or may be formed of a tubular member attached to pass through the circumferential wall of the cylindrical housing.

When the perforator of the present invention is connected to the gas bottle outlet, the first piston moves due to the actuation of the ignition device, and the second piston, which is collided and pushed by the first piston, moves towards the second opening coaxially with the first piston.

The second piston then collides with and breaks the closing member, thereby allowing the gas to flow out from the gas outlet.

The flowing gas enters the cylindrical housing and is then discharged from the third opening (the gas discharge portion).

In one aspect of the perforator of the Invention 1, it is possible that:

the cylindrical housing has a first piston moving space in which the first piston moves and a second piston moving space in which the second piston moves, the length of the first piston moving space is less than the length of the second piston moving space;

the first piston has a portion with a maximum outer diameter (D1), and the second piston has a portion with a maximum outer diameter (D2) which is less than the outer diameter of the portion with the maximum outer diameter (D1);

the first piston moving space has a first protrusion for stopping the axial movement of the first piston by collision with the portion with the maximum outer diameter (D1) thereof; and the second piston moving space has a second protrusion for stopping the axial movement of the second piston by collision with the portion with the maximum outer diameter (D2) thereof.

A space inside the cylindrical housing exclusive of the portion to which the ignition device is attached corresponds to the moving space for the two pistons.

The length of the first piston moving space is less than the length of the second piston moving space.

When the igniter is actuated, the first piston stops moving in the middle, but the second piston separates from the first piston, continues moving, and breaks the closing member.

The moving distance, as referred to herein, is a distance from an initial position of each piston before actuation to a position where each piston moves farthest in the axial direction after the actuation of the igniter.

In the first piston and the second piston, the portion with the maximum outer diameter (D1) of the first piston and the portion with the maximum outer diameter (D2) of the second piston satisfy the relationship of D1>D2.

When the first piston moves in the first piston moving space, the movement is stopped when the portion with the maximum outer diameter (D1) contacts the first protrusion.

The first protrusion may be any protrusion capable of stopping the movement of the first piston, for example, an annular step surface formed by differentiating the inner diameter of the first piston moving space from the inner diameter of the second piston moving space, or a projection which projects from the inner wall surface of the cylindrical housing forming the first piston moving space.

The movement of the first piston in the axial direction is stopped by making the inner diameter of the first protrusion (when the first protrusion is in the form of a plurality of projections formed in the circumferential direction, the inner diameter is the diameter of the virtual circle obtained by connecting the distal ends on the inner side of the first protrusions) less than the maximum outer diameter (D1) of the first piston.

When the second piston moves in the second piston moving space, the movement is stopped when the portion with the maximum outer diameter (D2) contacts the second piston protrusion.

The second protrusion may be any protrusion capable of stopping the movement of the second piston, for example, projections which project from the inner wall surface of the cylindrical housing forming the second moving space.

In order to stop the movement of the second piston reliably with the projection, a plurality of projections (for example, three to six projections) formed equidistantly in the circumferential direction, or an annular projection is preferred.

The movement of the second piston in the axial direction can be stopped by making the distance between the plurality of opposing projections serving as the second protrusion (the diameter of the virtual circle obtained by connecting the distal ends on the inner side of the second protrusions), or by making the inner diameter of the annular projection less than the maximum outer diameter (D2) of the second piston.

The first piston does not move in the second piston moving space, but before the actuation, part (including the portion with the maximum outer diameter) of the second piston may be positioned in the first piston moving space.

At a point of time in which the second piston breaks the closing member after the actuation of the igniter, the first piston and the second piston are separated from each other. As a result of receiving the pressure created by the discharge of the pressurized gas, the second piston retracts towards the first piston. Therefore, the second piston does not become an obstacle when the pressurized gas is discharged, and a large amount of the gas is instantaneously discharged.

In one aspect of the perforator of the Invention 1, it is possible that:
the cylindrical housing has a first piston moving space in which the first piston moves and a second piston moving space in which the second piston moves, the length of the first piston moving space is less than the length of the second piston moving space;
the second piston has a second piston head corresponding to a portion with the maximum outer diameter (D2) and a second piston rod with an outer diameter less than that of the second piston head;
the first piston has a portion with a maximum outer diameter (D1) which is larger than the maximum outer diameter (D2) of the second piston head;
the first piston moving space has a first protrusion for stopping the axial movement of the first piston by collision with the portion with the maximum outer diameter (D1) thereof;
the second piston moving space has a second protrusion for stopping the axial movement of the second piston by collision with the second piston head corresponding to the portion with the maximum outer diameter (D2) thereof; and
the second piston is disposed such that at least part of the second piston head is inside the first piston moving space, and the second piston rod is supported by the second protrusion.

The second piston has a second piston head and a second piston rod extending from the second piston head. The second piston head corresponds to a portion with the maximum outer diameter (D2), and the outer diameter of the second piston rod is less than D2.

The first piston has a portion with the maximum outer diameter (D1), and D1>D2.

When the first piston moves in the first piston moving space, the movement is stopped when the portion with the maximum outer diameter (D1) contacts the first protrusion.

By making the inner diameter of the first protrusion less than the maximum outer diameter (D1) of the first piston, it is possible to stop the axial movement of the first piston.

When the second piston moves in the second piston moving space, the movement is stopped when the portion with the maximum outer diameter (D2) contacts the second protrusion.

By making the inner diameter of the second protrusion less than the maximum outer diameter (D2) of the second piston, it is possible to stop the axial movement of the second piston.

At the time of actuation, the second piston receives the movement of the first piston (collides with the first piston) and moves in the axial direction. Therefore, the portion with the maximum outer diameter (D2) of the second piston head is less than the inner diameter of the first protrusion.

Before the actuation, the second piston rod is supported by the second protrusion.

Here, "the second piston rod is supported by the second protrusion" indicates a state where the entire outer circumferential surface of the second piston rod or part thereof is in slidable contact with the second protrusion.

By maintaining such a state, it is possible to support the second piston before the actuation and also to prevent the central axis of the second piston rod from displacing in the radial direction before and after the actuation.

In one aspect of the perforator of the Invention 1, it is possible that
the second piston head is held with respect to the inner wall surface of the cylindrical housing by a stopper member which is breakable at the time of actuation and the second piston head is disposed such that at least part of the second piston head is in the first piston moving space.

By holding the second piston head with such a stopper member, it is possible to completely prevent the second piston from moving towards the second opening before actuation.

The stopper member can use a combination of a plurality of resin projections that project from the second piston head, or a combination of a plurality of resin projections that project from the inner circumferential surface of the cylindrical housing that forms the first piston moving space.

The stopper member prevents the movement of the second piston before the actuation and can be easily bent or broken at the time of actuation, thereby causing the second piston to move.

In the housing of the Invention 2, a first cylindrical housing and a second cylindrical housing are combined in a "T-like" planar shape, and it is preferred that the first cylindrical housing and the second cylindrical housing are combined such that the central axes thereof are perpendicular to each other. However, the axes of the two housings may be inclined to each other at an angle between about 45° and 135°.

The first cylindrical housing and the second cylindrical housing are formed of the same material which is a metal such as iron and stainless steel. The first cylindrical housing and the second cylindrical housing may be famed integrally or may be combined, for example, by welding separate members.

Since the first piston is disposed inside the first cylindrical housing, and at least the second piston rod of the second piston is disposed inside the second cylindrical housing, the angle formed by the central axis of the first piston (the first piston rod) and the central axis of the second piston (the second piston rod) is the same as the crossing angle of the housing axes.

Since the first piston moves in the first cylindrical housing, the inside of the first cylindrical housing is the first piston moving space.

Since the second piston moves in the second cylindrical housing, the inside of the second cylindrical housing is the second piston moving space.

The distal end surface of the first piston rod is a first inclined surface, the bottom surface of the second piston head is a second inclined surface, and the two surfaces are shaped to be mutually abuttable.

When the central axis of the first piston (the first cylindrical housing) and the central axis of the second piston (the second cylindrical housing) are perpendicular to each other, the first inclined surface and the second inclined surface are each preferably a sloped surface at an angle of about 45 degrees (about ½×90 degrees) with respect to the axial direction.

Further, when the angle famed by the central axis of the first piston (the first cylindrical housing) and the central axis of the second piston (the second cylindrical housing) is an angle α, it is preferred that the first inclined surface and the second inclined surface are each a sloped surface at an angle of about ½×α with respect to the axial direction.

The first inclined surface of the first piston and the second inclined surface of the second piston are disposed opposite each other at a distance or in a state of abutment against each other.

Therefore, when the first piston (the first piston rod) moves at the time of actuation, where the first inclined surface contacts the second inclined surface of the second piston (the bottom surface of the second piston head), the second piston moves in the direction different from the movement direction of the first piston (in the axial direction of the second cylindrical housing).

When the perforator of the present invention is connected to the gas bottle, the first piston moves in the first cylindrical housing as a result of actuation of the ignition device, and the second piston which is pushed by the first piston moves in the second cylindrical housing.

The second piston then collides with and breaks the closing member at the gas outlet of the gas bottle. As a result, the gas flows out from the gas outlet.

The flowing gas enters the second cylindrical housing and is then discharged from the gas discharge portion which is the third opening.

The perforators of the above-described inventions can be the one having an open second opening, or the one having a closed second opening according to a gas bottle to be used.

When using a gas bottle filled with a gas under a high pressure (a gas bottle having the gas outlet closed with a closing member), the perforator having the open second opening is used.

When using a gas bottle filled with no gas and having a closed gas outlet, the perforator having the open second opening is used.

When using a gas bottle filled with no gas and having an open gas outlet, the second opening is closed with a closing member, instead of closing the gas outlet of the gas bottle.

A gas bottle without gas is filled with the gas after being attached to the perforator.

A gas bottle which is filled in advance with a gas under a high pressure may be used, or a gas bottle may be filled with a gas after connecting the perforator and the gas bottle.

An example of a method of charging gas into a gas bottle can include steps of shallowly inserting a closing pin to a gas charging hole formed in a gas bottle, inserting a gas injector (for example, provided with a gas injection device like an injection needle) to a gap between the gas charging hole and the closing pin and injecting therein a gas, removing the gas injector after injection, deeply inserting the closing pin and integrating the closing pin with the gas bottle by welding.

A connection method for connecting the second opening of the cylindrical housing (or the second cylindrical housing) and the gas outlet of the gas bottle is not particularly limited.

For example, a method of screwing together a threaded portion famed on the inner circumferential wall of the second opening and a threaded portion formed on the outer circumferential wall of the gas outlet, and a method of fitting the gas outlet into the second opening and then welding can be used.

A gas discharge apparatus can be used for injecting a gas into an inflatable article such as an airbag to inflate the article, for injecting a gas into a non-inflatable article, for using a gas pressure as a drive source, and for blowing a gas.

By combining the perforator of the present invention with a gas bottle, it is possible to discharge a large amount of gas instantaneously.

EMBODIMENTS OF INVENTION (1) Perforator Depicted in FIGS. 1 to 5

As depicted in FIG. 1, a perforator 1 is used in combination with a gas bottle 70 formed of iron and filled with a gas under a high pressure.

A gas outlet 71 of the gas bottle 70 is closed with a closing member 73 formed of iron (a disk-shaped iron material).

Figure 2:
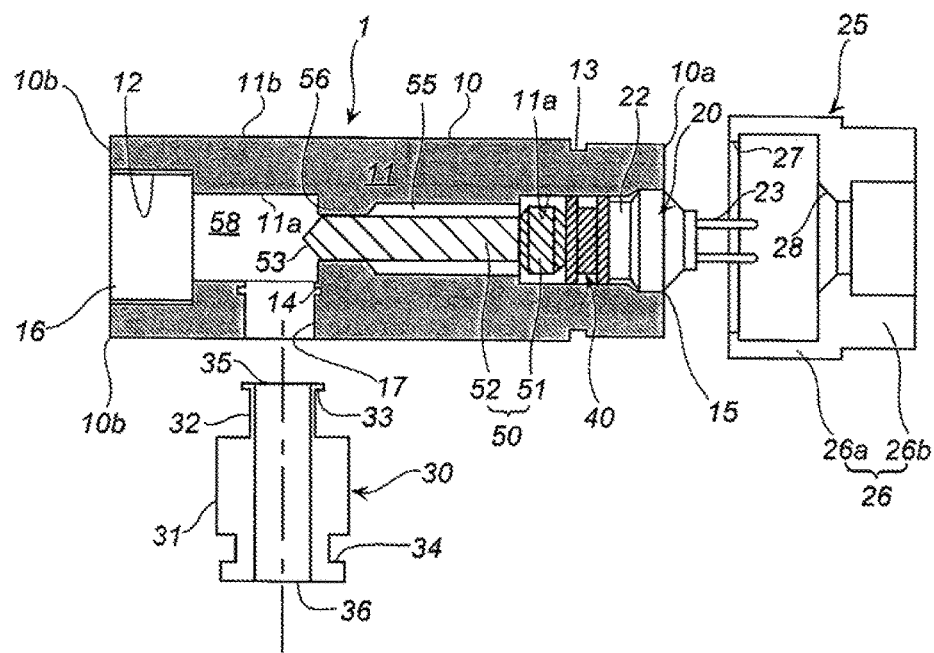
FIG. 2 shows an axial sectional view of the perforator depicted in FIG. 1 before assembled.

As depicted in FIG. 2, a cylindrical housing 10 has three openings, namely, a first opening 15 at a first end portion 10a, a second opening 16 at a second end portion 10b which is opposite to the first end portion 10a, and a third opening 17 formed to pass through a circumferential wall 11 (from an inner circumferential wall surface 11a to an outer circumferential wall surface 11b).

An electric igniter 20 is fixed as an ignition device at the first opening 15 of the cylindrical housing 10.

The electric igniter 20 is held by the inner circumferential wall surface 11a at the first end portion 10a of the cylindrical housing 10 and an igniter holder 25 which is fixed to the outer circumferential wall surface 11b at the first end portion 10a of the cylindrical housing 10.

In the electric igniter 20, an ignition portion 22 is positioned inside the cylindrical housing 10, and an electroconductive pin 23 is positioned outside the cylindrical housing 10.

The igniter holder 25 is a resilient member famed of a metal such as aluminum, stainless steel, or iron.

The igniter holder 25 has a substantially cylindrical main body portion 26, an inward annular projecting portion 27 formed at the opening at one end, and an annular igniter holding portion 28 projecting inwardly in about the middle of the lengthwise direction.

The substantially cylindrical main body portion 26 includes a thinner portion 26a and a thicker portion 26b.

The inward annular projecting portion 27 is formed at the thinner portion 26a and has a high degree of resilience.

The annular igniter holding portion 28 is formed in the thicker portion 26b.

Figure 3:
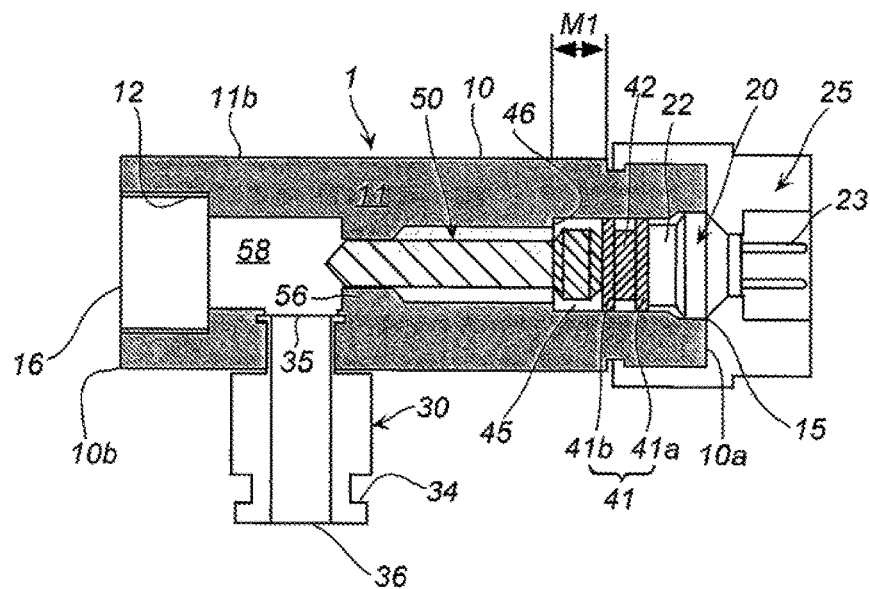
FIG. 3 shows an enlarged view of the perforator depicted in FIG. 1.

As depicted in FIG. 3, the igniter holder 25 is press-fitted on the first opening 15 (the first end portion 10a) of the cylindrical housing 10. The inner diameter of the thinner portion 26a and the outer diameter of the first opening 15 (the first end portion 10a) side of the cylindrical housing 10 are adjusted such that the inward annular projecting portion 27 fits into (is caught on) an annular groove 13 and also such that the thinner portion 26a including the inward annular projecting portion 27 applies a force, such that pushes radially inward, to the outer circumferential wall surface 11b of the cylindrical housing 10.

As a result of such an adjustment, the igniter holder 25 is prevented from falling off in the axial direction, and thereby the electric igniter 20 does not fall off but is retained. The igniter holder 25 may be fixed to the cylindrical housing 10 by a known method such as screwing or welding.

The second opening 16 of the cylindrical housing 10 is connected to the gas outlet 71 of the gas bottle 70.

A method of connecting the second opening 16 of the cylindrical housing 10 and the gas outlet 71 of the gas bottle is not particularly limited.

In FIGS. 1 to 3, the connection is obtained by screwing a threaded portion 72 formed at the gas outlet 71 of the gas bottle into the threaded portion 12 formed in the inner circumferential wall surface 11a at the second opening 16.

The third opening 17 of the cylindrical housing 10 functions as a gas discharge portion.

An resilient cylindrical gas discharge member 30 formed of a metal such as aluminum, stainless steel, or iron is attached to the third opening 17.

The cylindrical gas discharge member 30 has a larger-diameter circumferential wall portion 31, a smaller-diameter circumferential wall portion 32, and a short flange 33 formed at an opening 35 of the smaller-diameter circumferential wall portion 32. An annular groove 34 is formed close to an opening 36 of the larger-diameter circumferential wall portion 31.

The outer diameter of the smaller-diameter circumferential wall portion 32 is adjusted to be slightly larger than the inner diameter of the third opening 17 of the cylindrical housing 10.

A flexible tube famed of a plastic or rubber can be connected, as necessary, to the cylindrical gas discharge member 30. In this case, the flexible tube can be fitted from the outside into the cylindrical gas discharge member 30 and then fastened and fixed with a fastening material (rubber, string, metallic wire or the like) in the annular groove 34.

The cylindrical gas discharge member 30 is attached by the short flange 33 press-inserted into the annular groove 14 which is formed in the wall surface of the third opening 17.

When the short flange 33 fits into (is caught on) the annular groove 14, and further, a force is applied such that the smaller-diameter circumferential wall portion 32 including the short flange 33 is pushed radially outward against the wall surface of the third opening 17, the cylindrical gas discharge member 30 is prevented from falling off in the axial direction.

As depicted in FIGS. 2 and 3, a first piston 40 and a second piston 50 are accommodated, in the order of description from a position close to the electric igniter 20, inside the cylindrical housing 10.

The first piston 40 and the second piston 50 are formed of a metal such as iron and stainless steel.

The first piston 40 includes two larger-diameter portions 41a, 41b at two ends and a smaller-diameter portion 42 located between the two larger-diameter portions 41.

The larger-diameter portion 41a and the larger-diameter portion 41b are of the same size and have the maximum outer diameter (D1) of the first piston 40.

The first piston 40 is disposed in a first piston moving space 45 inside the cylindrical housing 10.

The first piston moving space 45 is an elongated portion (M1) (see FIG. 3) from a top surface of the ignition portion 22 of the igniter 20 to a first protrusion 46.

The first piston 40 is supported by the larger-diameter portions 41a, 41b abutting against the inner circumferential wall surface 11a of the cylindrical housing, and the smaller-diameter portion 42 does not abut against the inner circumferential wall surface 11a. Since only the larger-diameter portions 41a, 41b abut against the inner circumferential wall surface 11a (that is, the contact area of the first piston 40 and the inner circumferential wall surface 11a is reduced), the axial movement of the first piston 40 is facilitated.

In the first piston 40, the first larger-diameter portion 41a abuts against the ignition portion 22 of the igniter 20, but the first larger-diameter portion 41a may not abut against the ignition portion 22.

The second piston 50 has a second piston head 51 and a second piston rod 52 extending from the second piston head 51.

The second piston head 51 is a portion with the maximum outer diameter (D2) of the second piston 50. Here, D1>D2.

As depicted in FIGS. 1 to 4, the two sides of the second piston head 51 in the thickness direction have an inclined shape, and the intermediate portion has the maximum outer diameter, but the second piston head may have a disk-like shape of a uniform diameter.

A distal end portion 53 of the second piston rod 52 has an arrowhead shape.

In the second piston 50, the second piston head 51 abuts against the larger-diameter portion 41b of the first piston 40, but the second piston head 51 may not abut against the larger-diameter portion 41b.

The second piston head 51 of the second piston 50 is disposed in the first piston moving space 45, but the second piston rod 52 is disposed in a second piston moving space 55.

The second piston moving space 55 is an elongated portion (M2) (see FIG. 5) from the first protrusion 46 to a second protrusion 56. Here, M2>M1.

The inner diameter of the second piston moving space 55 is larger than the maximum outer diameter (D2) of the second piston head 51.

The first protrusion 46 is formed of an annular step surface obtained by reducing an inner diameter between the first piston moving space 45 and the second piston moving space 55.

The inner diameter of the first protrusion (the annular step surface) 46 is nearly equal to the outer diameter of the smaller-diameter portion 42 of the first piston. Therefore, when the first piston 40 moves in the axial direction, the larger-diameter portion 41a of the first piston collides with the first protrusion (the annular step surface) 46.

Figure 4:
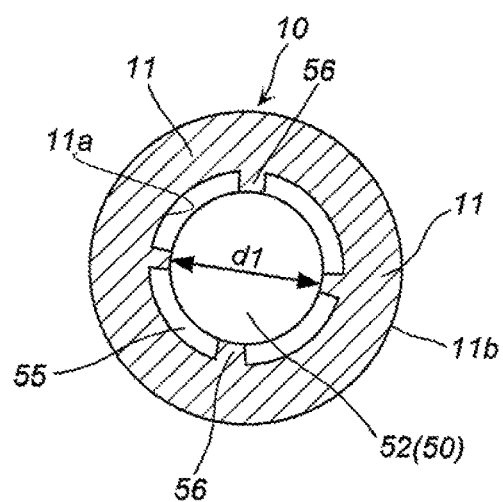
FIG. 4 shows a radial sectional view for explaining the positional relation of the second piston and the second protrusions in the perforator depicted in FIG. 3.

As depicted in FIG. 4, the second protrusion 56 is in the form of four projections that project from the inner circumferential wall surface 11a of the cylindrical housing 10 forming the second piston moving space 55. The four second protrusions 56 are formed equidistantly in the circumferential direction. The number of the second protrusions 56 can be about 3 to 6.

The distance (d1 in FIG. 4) between the second protrusions 56 facing each other in the radial direction is nearly equal to the outer diameter of the second piston rod 52 and is adjusted to enable the support of the second piston rod 52 before the actuation and the sliding of the second piston rod 52 at the time of actuation.

Therefore, the second piston rod 52 is supported by the four second protrusions 56, and when the second piston 50 moves in the axial direction, the second piston head 51 collides with the second protrusions 56.

The second piston rod 52 is supported by the second protrusions 56 before and after the actuation.

The operation of the perforator 1 will be explained hereinbelow with reference to FIGS. 3 to 5.

In practical use, the perforator 1 is connected to the gas bottle 70 and also connected to a gas introduction container such as an airbag, but explained hereinbelow is only the operation of the perforator 1.

FIG. 3 depicts a state before the actuation.

In the first piston 40, the larger-diameter portion 41a abuts against the ignition portion 22 of the igniter, and the larger-diameter portions 41a, 41b abut against the inner circumferential wall surface 11a of the cylindrical housing.

In the second piston 50, the second piston head 51 abuts against the larger-diameter portion 41b of the first piston 40, and the second piston rod 52 is supported by the second protrusions 56.

A variety of embodiments of the perforator 1 can be considered. Examples thereof include an embodiment of the perforator 1 in which the first piston 40 and the second piston 50 are arranged in the transverse direction, an embodiment of the perforator 1 in which the first piston 40 and the second piston 50 are arranged in the oblique direction, with the igniter 20 being on the lower side, and an embodiment of the perforator 1 in which the first piston 40 and the second piston 50 are arranged in the vertical direction, with the igniter 20 being on the lower side. Therefore, before the actuation, the first piston 40 and the second piston 50 can abut against each other or can be at a distance from each other inside the perforator 1.

Figure 5:
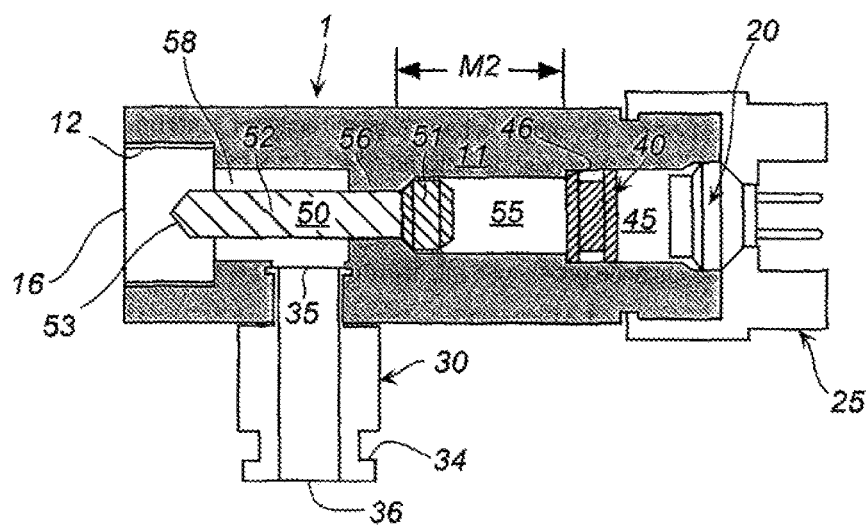
FIG. 5 shows an axial sectional view for explaining the operation of the perforator depicted in FIG. 4.

FIG. 5 depicts a state after the actuation.

Where the igniter 20 is actuated, combustion products are generated from the ignition portion 22. Therefore, as a result of receiving the pressure of the combustion products, the first piston 40 moves in the axial direction inside the first piston moving space 45 and collides with the first protrusion (the annular step surface) 46, and subsequent movement thereof is stopped.

As a result of receiving the axial movement of the first piston 40 (as a result of the collision of the first piston 40 with the second piston 50), the second piston 50 also moves in the same axial direction as the first piston 40 inside the second piston moving space 55, collides with the second protrusions 56, and stops. At this time, since the second piston rod 52 moves while being supported by the second protrusions 56, the guide function of the second protrusions 56 prevents the central axis of the second piston rod 52 from displacing.

When the gas bottle 70 is attached to the perforator 1, the arrowhead-shaped distal end portion 53 of the second piston rod passes through a gas inflow space 58 and through the closing member 73 (see FIG. 1) of the gas bottle 70. The second piston head 51 then collides with the second protrusions 56 (see FIG. 5), and subsequent movement thereof is stopped.

The closing member 73 that closes the gas outlet 71 is broken, and the gas inside the gas bottle 70 flows into the gas inflow space 58.

At this time, under the pressure of the gas flowing into the gas inflow space 58, the second piston 50 returns to the second piston moving space 55, and a large gas discharge path from the gas inflow space 58 to the gas discharge member 30 is opened.

The gas flowing into the gas inflow space 58 passes, from the opening 35 of the smaller-diameter circumferential wall portion 32, inside the gas discharge member 30 and is discharged from the opening 36 of the larger-diameter circumferential wall portion 31.

After actuation of the igniter, the combustion products (gas) from the ignition portion 22 are present in the first piston moving space 45, and the first piston 40 is fixed in a state where the larger-diameter portion 41b abuts against the first protrusion 46.

However, at a point of time in which the closing member 73 is ruptured, the first piston 40 and the second piston 50 are separated from each other, nothing is interposed therebetween, and the motion of the second piston 50 is unlikely to be affected by the first piston 40.

Therefore, after the actuation, the second piston 50 can freely slide between the gas inflow space 58 and the second piston moving space 55.

Further, when the first piston 40 and the second piston 50 are separated from each other before the actuation, since the first piston 40 needs to collide with the second piston head 51 before abutting against the first protrusion 46, at least part of the second piston head 51 needs to be present inside the first piston moving space 45.

Further, in the case of the gas bottle 70 in which the gas outlet 71 is not closed by the closing member 73, the closing member can close between the second opening 16 and the gas inflow space 58.

Figure 6:
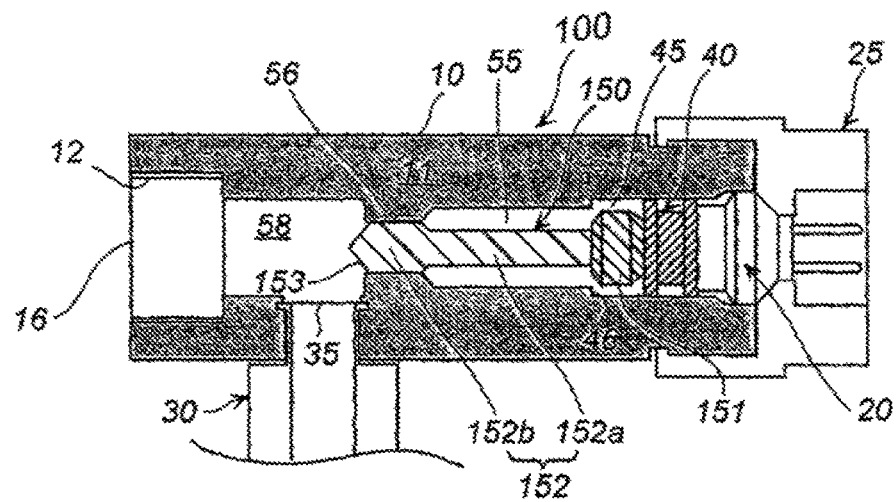
FIG. 6 shows an axial sectional view of the perforator of another embodiment.

(2) Perforator Depicted in FIG. 6

A perforator 100 depicted in FIG. 6 is the same as the perforator 1 depicted in FIGS. 1 to 5, except that the shape of a second piston rod 152 of a second piston 150 is different.

The second piston 150 includes a second piston head 151 and a second piston rod 152.

The second piston rod 152 includes a rod main body portion 152a extending from the second piston head 151, and a rod distal end portion 152b extending from the rod main body portion 152a.

A distal end surface 153 of the rod distal end portion 152b has an arrowhead shape.

The outer diameter of the rod distal end portion 152b is larger than the outer diameter of the rod main body portion 152a.

The relationship between the rod distal end portion 152b and the second protrusions 56 is the same as the relationship between the second piston rod 52 and the second protrusions 56 depicted in FIG. 4.

Comparing the second piston rod 152 with the second piston rod 52 depicted in FIG. 3, the former is less in weight due to a smaller outer diameter of the rod main body portion 152a, but since the outer diameter of the rod distal end portion 152b is the same as the outer diameter of the second piston rod 52, the breaking pressure with respect to the closing member is not changed.

Figure 7:
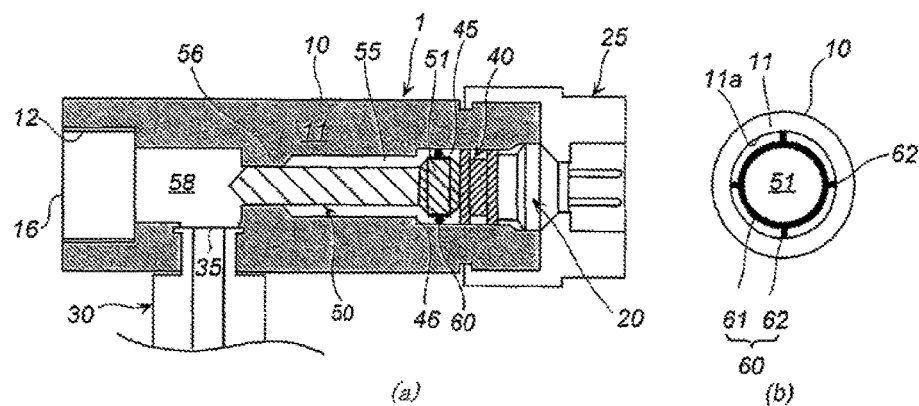
FIG. 7 shows an axial sectional view of the perforator of another embodiment.

(3) Perforator Depicted in FIG. 7

A perforator 1 depicted in FIG. 7 is the same as the perforator 1 depicted in FIGS. 1 to 5, except that a stopper member 60 famed of a resin is attached to the second piston head 51 of the second piston 50.

In the stopper member 60, an annular main body portion 61 and protruding portions 62 that protrude from the outer surface of the annular main body portion 61 are molded integrally from a resin.

The annular main body portion 61 has a band-like shape, and the protruding portions 62 have a plate-like or rod-like shape. A total of four projecting portions 62 are formed equidistantly in the circumferential direction.

The stopper member 60 is fixed in a state in which the annular main body portion 61 is fitted into the outer circumferential surface of the second piston head 51. The fixing method is not limited, and a method using an adhesive, press-insertion, fastening, or integral molding with the second piston head can be employed.

Where the stopper member 60 is attached to the second piston head 51, the four protruding portions 62 of the stopper member 60 abut against the inner circumferential wall surface 11a of the cylindrical housing 10 (in the first piston moving space 45).

Therefore, before the actuation, the second piston 50 is completely prevented from moving in the axial direction.

When the second piston 50 moves in the axial direction at the time of actuation, the protruding portions 62 of the stopper member 60 are easily bent or broken due to collision with the first protrusion (the annular step surface) 46. Therefore, the axial movement of the second piston 50 is not inhibited.

The perforator 1 can be attached in a variety of ways in practical use, and many cases can be also considered in which the stopper member 60 is not needed.

For example, when the perforator 1 is disposed such that the igniter 20 is always in the downward direction, the metallic second piston 50 is unlikely to move in the axial direction against the gravity. Therefore, the stopper member 60 is not needed. The stopper member 60 is also not needed in a state where the second piston 50 is held between the second protrusions 56 and the first piston 40 and the second piston 50 is not moved by vibrations or the like.

Figure 8:
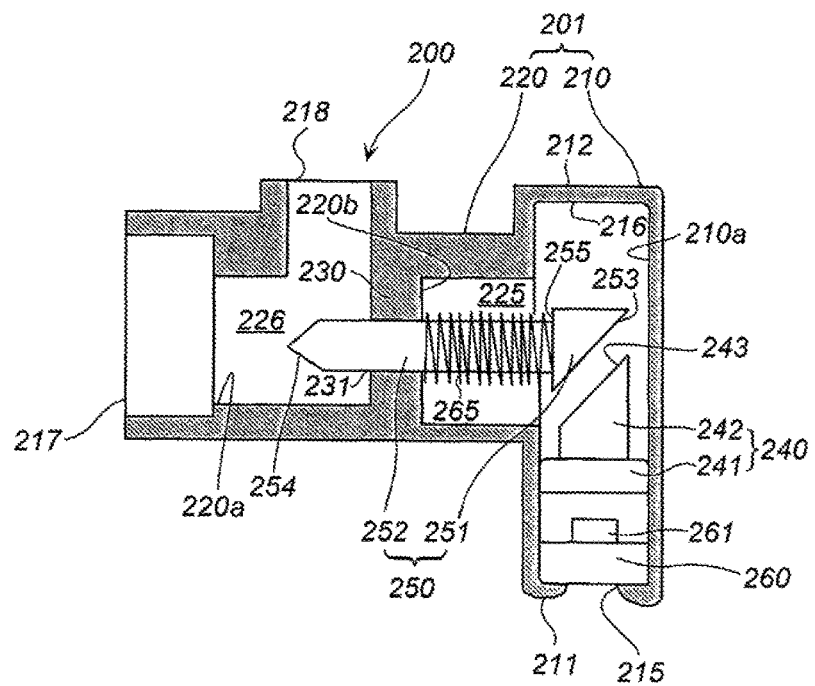
FIG. 8 shows the perforator of another embodiment, the housing being shown in a cross-sectional view, and the internal parts being shown in a plan view (in a state where one surface of the housing is removed)

(4) Perforator Depicted in FIG. 8

A perforator 200 is used in combination with the gas bottle 70 filled with a gas under a high pressure, in the same manner as the perforator 1 depicted in FIG. 1.

In a housing 201, a first cylindrical housing 210 and a second cylindrical housing 220 are integrally combined to obtain a substantially T-like planar shape such that the central axes of the two housings are perpendicular to each other.

The angle formed by the central axis of the first cylindrical housing 210 and the central axis of the second cylindrical housing 220 can be selected within a range of 45 degrees to 135 degrees according to the attachment location of the perforator.

In the first cylindrical housing 210, an open first opening 215 is provided at a first end portion 211, and a closed surface 216 is provided at a second end portion 212. The closed surface 216 may be closed by a member separate from the first cylindrical housing 210.

A second opening 217 is formed in the second cylindrical housing 220 on the side opposite to the connection portion with the first cylindrical housing 210, and a third opening 218 is formed in the circumferential surface of the second cylindrical housing 220.

The inside of the second cylindrical housing 220 is separated into a first chamber 225, which forms a space integral with the first cylindrical housing 210, and a second chamber 226, which communicates with the second opening 217 and the third opening 218, by a partition wall 230 that extends from the inner circumferential wall surface 220a of the second cylindrical housing and has a through hole 231 in the central portion.

An electric igniter 260 is fixed in the first opening 215 of the first cylindrical housing 210.

The second opening 217 of the second cylindrical housing 220 can be connected to the gas bottle 70 depicted in FIG. 1.

The third opening 218 of the second cylindrical housing 220 serves as a gas discharge portion, and the gas discharge member 30 depicted in FIG. 2 can be connected thereto.

A first piston 240 is disposed inside the first cylindrical housing 210.

The first piston 240 includes a first piston head 241 and a first piston rod 242 extending from the first piston head 241.

The distal end surface of the first piston rod 242 has a first inclined surface 243. The first inclined surface 243 forms an angle of 45 degrees with the central axis of the first piston rod 242.

The outer circumferential surface of the first piston head 241 abuts against an inner circumferential wall surface 210a of the first cylindrical housing 210.

A second piston 250 includes a second piston head 251 and a second piston rod 252 extending from the second piston head 251.

Since the outer diameter of the second piston rod 252 is less than the outer diameter of the second piston head 251, an annular step surface 255 is formed between the second piston head 251 and the second piston rod 252.

The bottom surface of the second piston head 251 has a second inclined surface 253, and the distal end surface of the second piston rod 252 is an arrowhead surface 254.

The second inclined surface 253 forms an angle of 45 degrees with the central axis of the second piston rod 252 and is in a shape that enables abutment against the first inclined surface 243 of the first piston 240.

The second piston 250 is disposed such that the second piston head 251 is positioned inside the first cylindrical housing 210 and the second piston rod 252 passes through the through hole 231 of the partition wall 230, part of the second piston rod 252 is positioned inside the first chamber 225 and the arrowhead surface 254 of the second piston rod 252 is positioned in the second chamber 226.

Since the second piston rod 252 is thus supported as a result of passing through the through hole 231 of the partition wall 230, the central axis of the second piston rod 252 is not displaced in the radial direction before and after the actuation.

A portion of the second piston rod 252 positioned inside the first chamber 225 passes through a coil spring 265.

The coil spring 265 is disposed in the entire space between a partition wall surface 220b in the first chamber 225 and the annular step surface 255 of the second piston head 251 or in part thereof.

The first piston 240 and the second piston 250 are disposed such that the first inclined surface 243 of the first piston 240 and the second inclined surface 253 of the second piston 250 face each other in the axial direction at a distance from each other, and such that the central axes of the first piston 240 and the second piston 250 are perpendicular to each other. Before the actuation, the first inclined surface 243 and the second inclined surface 253 may abut against each other. Further, FIG. 8 depicts a state where the first piston head 241 of the first piston 240 is separated from an ignition portion 261 of the igniter 260, but they may abut against each other.

The operation of the perforator 200 will be explained hereinbelow with reference to FIG. 8.

In practical use, the perforator 200 is connected to the gas bottle 70 and also connected to a gas introduction container such as an airbag, but explained hereinbelow is only the operation of the perforator 200.

Where the igniter 260 is actuated, combustion products are generated from the ignition portion 261. Therefore, as a result of receiving the pressure of the combustion products, the first piston 240 moves in the axial direction inside the first cylindrical housing 210, and the first inclined surface 243, which is at the distal end of the first piston rod 242, collides with the second inclined surface 253 of the second piston head 251.

As a result of receiving the collision of the first inclined surface 243 with the second inclined surface 253 (the first inclined surface 243 collides with the second inclined surface 253), the second piston 250 moves, while compressing the coil spring 265, in the direction perpendicular to the movement direction of the first piston 240.

The arrowhead surface 254 of the second piston rod moves inside the second chamber 226 serving as a gas inflow space, and when the gas bottle 70 is attached, the arrowhead surface passes through a position where the closing member 73 is located (ruptures the closing member 73).

The second piston 250 is then returned to the state depicted in FIG. 8 by the action of the compressed coil spring 265 and the gas from the gas bottle 70.

The first piston 240 moves in the axial direction and reaches the closed surface 216. In this case, since the second piston 250 returns to the position depicted in FIG. 8, the first piston 240 does not return to the side of the igniter 260. Further, at this time, a cushioning material can be also disposed as a buffer material for the first piston at the closed surface 216 in order to prevent the first piston 240 from returning to the side of the igniter 260 as a result of collision with the closed surface 216 and from blocking the second piston 250 returning to the state depicted in FIG. 8 by the action of the coil spring 265.

When the perforator 200 is connected to the gas bottle 70, the closing member 73 (see FIG. 1) that closes the gas outlet 71 is broken and the gas flows in from the gas bottle 70.

At this time, since the second piston 250 returns to the state depicted in FIG. 8 and a large gas discharge path is opened from the second chamber 226 serving as the gas inflow space to the third opening 218, the gas is effectively discharged.

Figure 9:
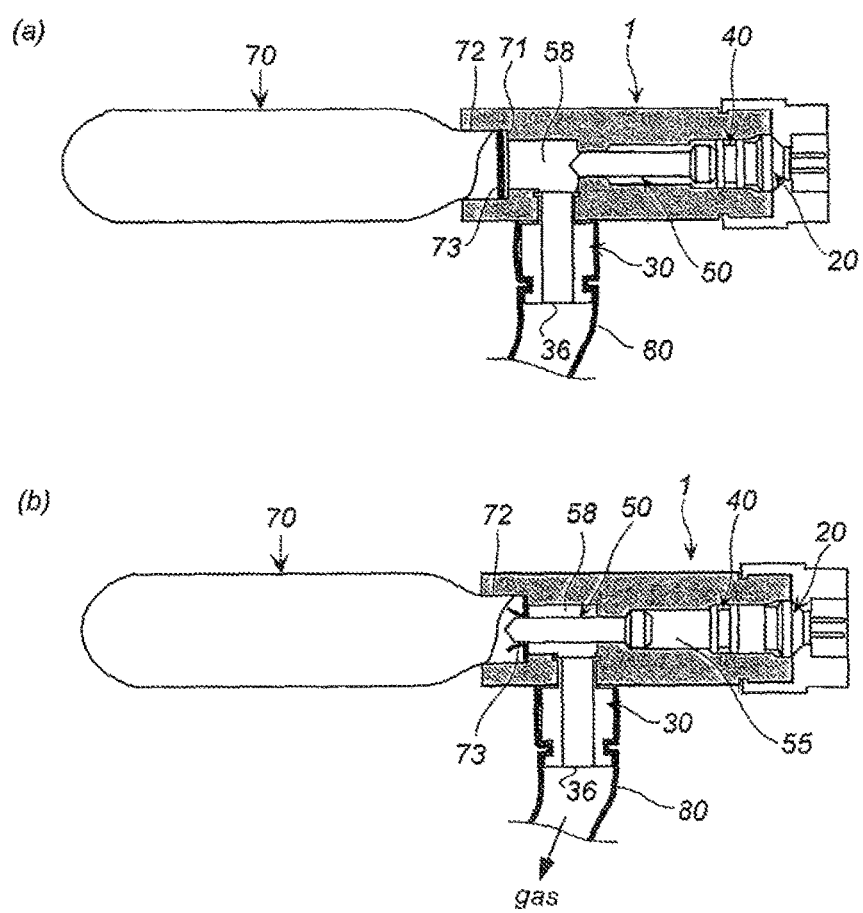
FIG. 9 shows, in (a), an axial sectional view of the gas discharge apparatus of the present invention before actuation, only part of the gas bottle on the side of the gas outlet being shown in a cross-sectional view, the rest being shown in a plan view, and in (b), a view for explaining the operation of the apparatus depicted in (a).

(5) Gas Discharge Apparatus Depicted in FIG. 9

A gas discharge apparatus in which the perforator 1 (in FIG. 3) is combined with the gas bottle 70 will be explained with reference to (a) and (b) in FIG. 9.

The perforator 1 is combined with the gas bottle 70 by screwing the threaded portion 72 of the gas bottle 70 into the threaded portion 12 of the second opening 16 of the perforator 1 depicted in FIG. 3 to assemble the gas discharge apparatus.

Before the actuation, in a state depicted in (a) in FIG. 9, the second opening 16 is closed by the closing member 73 that closes the gas outlet 71 of the gas bottle 70.

A plastic tube 80 is fitted from the outside to the gas discharge member 30. In this case, fastening in the position of the annular groove 34 can be also optionally performed with a fastening material.

An opening at the opposite side of the tube 80 is connected, for example, to an airbag into which the gas is discharged.

Where the igniter 20 of the perforator 1 is actuated, the first piston 40 moves in the axial direction. As a result, the second piston 50 moves in the same axial direction and breaks the closing member 73 that closes the gas outlet 71 ((b) in FIG. 9).

Since the second piston 50 then returns to the second piston moving space 55, the gas flows from the opened gas outlet 71 into the gas inflow space 58, and the gas flowing into the gas inflow space 58 passes through the inside of the gas discharge member 30 and is then discharged through the inside of the tube 80.

A gas discharge apparatus of the present invention can be used to be incorporated in protective clothing for alleviating an impact to a person when falling, for sea rescue, or for a person involved in snowslide, which includes a wearable airbag to introduce therein a discharged gas and inflate.

The gas discharge apparatus of the present invention can be also used as a perforator which is incorporated in an extinguishing device for extinguishing fire by discharging carbon dioxide gas or by discharging a fire extinguishing agent together with a gas such as carbon dioxide gas, or in a marker device for ejecting a colored paint to put a mark on a bill or a theft offender.

The present invention is thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A perforator for breaking and opening a closing member at a gas outlet of a gas bottle to allow a gas to flow out, comprising:

a cylindrical housing accommodating an ignition device, a first piston and a second piston, the cylindrical housing having three openings, namely, a first opening at a first end portion, a second opening at a second end portion which is opposite to the first end portion, and a third opening formed in a circumferential wall portion, the ignition device being fixed at the first opening, the second opening to be connected to the gas bottle and the third opening serving as a gas discharge portion, the first piston and the second piston being disposed, in the order of the first piston and the second piston, from the side of the ignition device to the side of the second opening in the cylindrical housing, and when a pressure created by actuation of the ignition device is received, the first piston moving in an axial direction inside the cylindrical housing, and the second piston moving towards the second opening inside the cylindrical housing by receiving the movement of the first piston, wherein the cylindrical housing has a first piston moving space in which the first piston moves and a second piston moving space in which the second piston moves, the length of the first piston moving space is less than the length of the second piston moving space;

the first piston has a portion with a maximum outer diameter (D1), and the second piston has a portion with a maximum outer diameter (D2) which is less than the outer diameter of the portion with the maximum outer diameter (D1);

the first piston moving space has a first protrusion for stopping the axial movement of the first piston by collision with the portion with the maximum outer diameter (D1) thereof; and the second piston moving space has a second protrusion for stopping the axial movement of the second piston by collision with the portion with the maximum outer diameter (D2) thereof.

2. A gas discharge apparatus in which the perforator according to claim 1 is combined with a gas bottle, wherein the gas bottle is connected to the second opening of the housing of the perforator.

3. A perforator for breaking and opening a closing member at a gas outlet of a gas bottle to allow a gas to flow out, comprising:

a cylindrical housing accommodating an ignition device, a first piston and a second piston, the cylindrical housing having three openings, namely, a first opening at a first end portion, a second opening at a second end portion which is opposite to the first end portion, and a third opening formed in a circumferential wall portion, the ignition device being fixed at the first opening, the second opening to be connected to the gas bottle and the third opening serving as a gas discharge portion, the first piston and the second piston being disposed, in the order of the first piston and the second piston, from the side of the ignition device to the side of the second opening in the cylindrical housing, and when a pressure created by actuation of the ignition device is received, the first piston moving in an axial direction inside the cylindrical housing, and the second piston moving towards the second opening inside the cylindrical housing by receiving the movement of the first piston, wherein the cylindrical housing has a first piston moving space in which the first piston moves and a second piston moving space in which the second piston moves, the length of the first piston moving space is less than the length of the second piston moving space;

the second piston has a second piston head corresponding to a portion with the maximum outer diameter (D2) and a second piston rod with an outer diameter less than that of the second piston head;

the first piston has a portion with a maximum outer diameter (D1) which is larger than the maximum outer diameter (D2) of the second piston head;

the first piston moving space has a first protrusion for stopping the axial movement of the first piston by collision with the portion with the maximum outer diameter (D1) thereof;

the second piston moving space has a second protrusion for stopping the axial movement of the second piston by collision with the second piston head corresponding to the portion with the maximum outer diameter (D2) thereof; and the second piston is disposed such that at least part of the second piston head is inside the first piston moving space, and the second piston rod is supported by the second protrusion.

4. The perforator according to claim 3, wherein the second piston head is held with respect to the inner wall surface of the cylindrical housing by a stopper member which is breakable at the time of actuation, and the second piston head is disposed such that at least part of the second piston head is in the first piston moving space.

5. A gas discharge apparatus in which the perforator according to claim 3 is combined with a gas bottle, wherein the gas bottle is connected to the second opening of the housing of the perforator.

\* \* \* \* \*